(12) United States Patent
Takaoka et al.

(10) Patent No.: US 10,722,818 B2
(45) Date of Patent: Jul. 28, 2020

(54) AGITATION/DEFOAMING METHOD AND AGITATION/DEFOAMING DEVICE

(71) Applicant: SHASHIN KAGAKU CO., LTD., Kyoto-shi, Kyoto (JP)

(72) Inventors: Fumihiko Takaoka, Kyoto (JP); Yuki Nakamura, Kyoto (JP)

(73) Assignee: SHASHIN KAGAKU CO., LTD., Kyoto-shi, Kyoto (JP)

( * ) Notice: Subject to any disclaimer, the term of this patent is extended or adjusted under 35 U.S.C. 154(b) by 164 days.

(21) Appl. No.: 15/769,647

(22) PCT Filed: Oct. 6, 2016

(86) PCT No.: PCT/JP2016/079869
§ 371 (c)(1),
(2) Date: Apr. 19, 2018

(87) PCT Pub. No.: WO2017/068995
PCT Pub. Date: Apr. 27, 2017

(65) Prior Publication Data
US 2018/0304175 A1    Oct. 25, 2018

(30) Foreign Application Priority Data

Oct. 23, 2015  (JP) ................................ 2015-208632

(51) Int. Cl.
*B01D 19/00* (2006.01)
*B01F 9/22* (2006.01)
(Continued)

(52) U.S. Cl.
CPC ......... *B01D 19/0057* (2013.01); *B01D 19/00* (2013.01); *B01F 9/0001* (2013.01);
(Continued)

(58) Field of Classification Search
CPC ... B01D 19/0057; B01D 19/00; B01F 9/0001; B01F 11/0008; B01F 9/003; B01F 9/0016; B01F 9/22; B01F 9/0021
(Continued)

(56) References Cited

FOREIGN PATENT DOCUMENTS

JP      H06-071110 A      3/1994
JP      2004074130 A  *   3/2004
(Continued)

OTHER PUBLICATIONS

Machine translation for JP-2015016403 A (Year: 2019).*
(Continued)

*Primary Examiner* — Huy Tram Nguyen
(74) *Attorney, Agent, or Firm* — Muncy, Geissler, Olds & Lowe, P.C.

(57) ABSTRACT

[Problem] To provide a agitation/defoaming method and device with which both of uniformity in dispersion of object to be processed and reduction of air bubbles can be achieved with high precision.
[Solution] Provided is a agitation/defoaming method for producing orbital and spin motions of a container containing object to be processed by a device provided with orbital and spin drive motors that can independently control the velocities of the orbital and spin motions. Both defoaming and agitating treatments with high precision can be achieved by respectively performing a reverse rotation superimposition processing, wherein the rotational frequency of the spin drive motor is obtained by superimposing the first rotational frequency in a direction opposite to the direction of the orbital motion on the frequency of the orbital motion, and a same rotation superimposition processing, wherein the rotational frequency of the spin drive motor is obtained by superimposing the second rotational frequency in the same
(Continued)

direction as the direction of the orbital motion on the frequency of the orbital motion, at least once.

12 Claims, 9 Drawing Sheets

(51) Int. Cl.
*B01F 9/00* (2006.01)
*B01F 11/00* (2006.01)

(52) U.S. Cl.
CPC ............ *B01F 9/003* (2013.01); *B01F 9/0016* (2013.01); *B01F 9/22* (2013.01); *B01F 11/0008* (2013.01); *B01F 9/0021* (2013.01)

(58) Field of Classification Search
USPC .......................................................... 366/209
See application file for complete search history.

(56) References Cited

FOREIGN PATENT DOCUMENTS

| JP | 2007-190464 A | 8/2007 |
|---|---|---|
| JP | 4084493 B2 | 4/2008 |
| JP | 4188411 B1 | 11/2008 |
| JP | 2012-192352 A | 10/2012 |
| JP | 2013-202482 A | 10/2013 |
| JP | 2013-255866 A | 12/2013 |
| JP | 2015016403 A * | 1/2015 |
| JP | 2015-048402 A | 3/2015 |
| JP | 2016-073970 A | 5/2016 |
| WO | 2013/183554 A1 | 12/2013 |
| WO | 2016/163267 A1 | 10/2016 |

OTHER PUBLICATIONS

Machine translation for JP-2004074130 A (Year: 2019).*
International Search Report of PCT/JP2016/079869 and English translation thereof.
Submission of Information filed against the JP corresponding patent application No. 2015-208632 with the Japan Patent Office (JPO) by a third party on Feb. 29, 2020 and accepted on Mar. 2, 2020.
KK series spec, [online], KURABO Environmental Mechatronics Department, [searched on Feb. 22, 2020], Internet [URL: https://www.kurabo.co.jp/el/mazerustar/kk/].

* cited by examiner

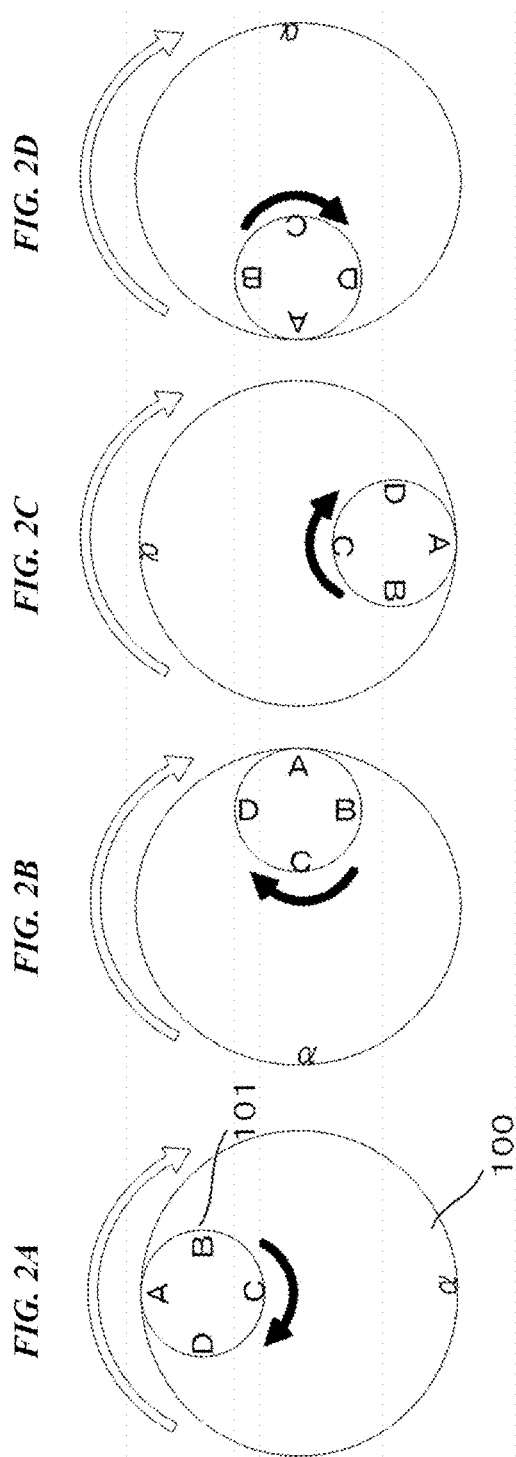

FIG. 6

| | | Silicone (60,000 cSt) | Silicone (100,000 cSt) | Silicone (300,000 cSt) |
|---|---|---|---|---|
| Before Defoaming | | | | |
| 600sec | Reverse rotation | | | |
| | Same rotation | | | |
| 1800sec | Reverse rotation | | | |
| | Same rotation | | | |

Frequency of Orbital motion : 1,000 rpm
Frequency of Rotation superimposed on Spin motion: 500 rpm
Object : 100 g

AGITATION/DEFOAMING METHOD AND AGITATION/DEFOAMING DEVICE

TECHNICAL FIELD

The present invention concerns to a method and a device for performing agitation/defoaming treatment by revolving and rotating a container containing object to be processed.

BACKGROUND ART

An agitation/defoaming device, for agitating/defoaming an object to be processed by revolving and rotating (spinning) a container containing the object, is known.

Such a agitation/defoaming device revolves the container so as to defoam the object, and rotates (spins) the container so as to agitate the object.

In the other words, the centrifugal force of the orbital motion (revolution) makes the object be pressed against the inside surface of the container so that air bubbles internally existing in the object move to the surface of the object and the object is defoamed, or the object in the surface portion rises along the inside wall surface of the container and a thin layer of the object is formed so that the air bubble whose size is larger than the thickness of the layer bursts and the object is defoamed.

Subsequently, the container is rotated (spun) using the device, and the spin motion makes the object be spirally flowed to agitate the object. Consequently, it is important for the agitation/defoaming device to achieve both agitating and defoaming effects.

Patent Literature 1 discloses a agitation/defoaming device, which includes an orbital drive motor and a spin drive motor and are used to agitate and defoam object contained in a container by controlling each of orbital and spin motions independently.

Patent Literature 2 discloses a technology for improving a defoaming effect by superimposing a cyclic variation component on the orbital motion and by changing the ratio of rotation to revolution (rotational frequency ratio of spin motion vs orbital motion).

Patent Literature 3 discloses a technology for improving a agitation/defoaming performance by reversing the orbital motion and the spin motion.

Patent Literature 4 discloses a technology for enhancing a defoaming effect by performing a agitation/defoaming treatment under reduced pressure.

CITATION LIST

Patent Literature

Patent Literature 1: Japanese Unexamined Patent Application Publication No. 06-071110
Patent Literature 2: Japanese Unexamined Patent Application Publication No. 2013-202482
Patent Literature 3: Japanese Unexamined Patent Application Publication No. 2007-190464
Patent Literature 4: Japanese Patent No. 4188411

SUMMARY OF INVENTION

Technical Problem

It is an important problem that both of uniformity of a component concentration distribution (dispersion) of the object and reduction in air bubbles internally existing in the object can be achieved.

However, if the frequency of the spin motion is increased in order to enhance the agitating effect, the defoaming effect tends to be decreased because the air bubbles may be atomized or in some cases air bubbles may be newly generated.

Additionally, if the centrifugal force is increased by increasing the frequency of the orbital motion in order to enhance the defoaming effect, such as when the object includes some components having different specific gravities, each component in the object is separated and the uniformity of the component concentration distribution tends to be degraded.

The defoaming effect can also be precisely increased by performing the agitation/defoaming treatment under reduced pressure. However, since it requires to ensure airtightness inside the device and to equip a vacuum pump and an exhaust system connected with the vacuum pump, costs for the devices are increased and it leads to a problem of larger exclusive area of the devices.

Additionally, when mixed liquid of materials having different specific saturation vapor pressures is agitated/defoamed, reduced pressure makes the material having higher saturation vapor pressure preferentially evaporate and it leads to a problem of changed component ratio of the mixed liquid.

The present invention has been made in view of the above-described problems, and a main technical subject of the present invention is to provide a agitation/defoaming method and a agitation/defoaming device that both uniformity in dispersion of the object to be processed and reduction in air bubbles can be achieved with high precision.

Solution to Problem

According to a agitation/defoaming method of the present invention, the method for agitation/defoaming the object, by producing an orbital motion (revolution) and a spin motion (rotation) of a container containing object to be processed,
it is characterized that the spin motion includes reverse and same rotation superimposition processings to be performed respectively,
wherein the reverse rotation superimposition processing is performed by superimposing a motion rotated at a first rotational frequency and in a direction opposite to the direction of the orbital motion on a rotational velocity with the same rotational direction as the direction of the orbital motion and the same rotational frequency as the frequency of the orbital motion, and
the same rotation superimposition processing is performed by superimposing, on the above motion, a motion rotated at a second rotational frequency and in the same direction as the direction of the orbital motion on a rotational velocity with the same rotational direction as the direction of the orbital motion and the same rotational frequency as the frequency of the orbital motion.

According to a agitation/defoaming method of embodiments of present invention, it is characterized that, by superimposing a rotational motion with a predetermined rotational frequency and a predetermined rotational direction same as or opposite to the orbital motion on the same rotational motion as the orbital motion for the spin motion, two kinds of processing conditions having different specific agitation/defoaming effects can be achieved.

Furthermore, these processing conditions having different specific effects are respectively performed at least once, and it can achieve both high precise agitating and defoaming.

Consequently, a processing ensuring both agitating and defoaming effect can be achieved and costs of the agitation/defoaming treatment can be decreased.

Note that "the same rotational (orbital and/or spin) frequency" means "substantially the same rotational (orbital and/or spin) frequency." Even if a variation of a rotational drive motor within the control range or a fine adjustment (about ten-odd %) in the rotational frequency for some reason, such as hardware or software control, is occurred, the rotational frequencies can also be considered "the same rotational frequency."

According to the agitation/defoaming method of the present invention, it is characterized that the first rotational frequency is equal to the second rotational frequency.

The first and second rotational frequencies are set so as to have the same frequencies, and thus, it makes a condition setting of the agitation/defoaming treatment simpler and allows costs required for determining the processing condition of the agitation/defoaming treatment to be decreased.

It is also characterized that the first rotational frequency can be in the range of 0.2 to 2.0 times the frequency of the orbital motion, and that the second rotational frequency can be the range of 0.05 to 1.6 times the frequency of the orbital motion.

By setting the first and second rotational frequencies independently to each condition giving priority to agitating and defoaming and to optimum conditions in a wider range, highly precise agitation/defoaming conditions can be determined.

It is also characterized that the agitation/defoaming method includes a processing of performing the same rotation superimposition processing after the reverse rotation superimposition processing.

The reverse rotation superimposition processing may also be performed after the same rotation superimposition processing as well.

In this way, according to product standards or property of the object, by selecting whether to perform the agitating treatment after the defoaming treatment or to perform the defoaming treatment after the agitating treatment, the agitation/defoaming treatment can be effectively performed.

A agitation/defoaming device of the present invention comprise:

a container holder provided with a spin shaft;

a rotational unit that the spin shaft rotatably contacts through a bearing;

an orbital shaft connected with the rotational unit;

an orbital drive motor connected with the orbital shaft using a first rotational motion transmission member;

a spin drive shaft connected with the container holder using a second rotational drive transmission member;

a spin drive motor connected with the spin drive shaft using a third rotational motion transmission member;

a first storage for storing a predetermined frequency of the orbital motion, a first rotational frequency, and a second rotational frequency;

an operation unit for calculating a first frequency of a spin motion that is obtained by subtracting the first rotational frequency from the frequency of the orbital motion stored in the first storage, and a second frequency of the spin motion that is obtained by adding the second rotational frequency to the frequency of the orbital motion stored in the first storage;

a second storage for storing the frequency of the orbital motion, the first frequency of the spin motion, and second frequency of the spin motion;

a flow storage for storing a processing order for driving the spin drive motor at the first or second frequency of the spin motion; and a control unit for driving the orbital drive motor at the at the frequency of the orbital motion in a predetermined orbital direction, reading the processing order stored in the flow storage and the first and second frequencies of the spin motion stored in the second storage, and driving the spin drive motor at the first or second frequency of the spin motion according to the processing order.

The agitation/defoaming device allows the container holder to be rotated at two different rotational velocities in a predetermined order while the container holder is being revolved, and can agitate/defoam the object precisely.

A agitation/defoaming device of the present invention comprise:

a container holder provided with a spin shaft;

a rotational unit that the spin shaft rotatably contacts through a bearing;

an orbital shaft fixed to the rotational unit;

an orbital drive motor having a rotor fixed to the orbital shaft;

a horizontal plate fixed to the orbital shaft;

a spin drive shaft connected with the container holder using a fourth rotational motion transmission member;

a spin drive motor that is connected with the spin drive shaft and that has a rotor fixed to the horizontal plate and;

a first storage for storing the frequency of the orbital motion, a first frequency of the spin motion, a second frequency of the spin motion, and a sign showing a rotational direction related to the first and second frequencies of the spin motion;

a flow storage for storing a processing order for driving the spin drive motor at the first frequency of the spin motion or the second frequency of the spin motion; and a control unit for driving the orbital drive motor at a predetermined orbital frequency in a predetermined orbital direction, reading the processing order stored in the second storage, the first frequency of the spin motion, the second frequency of the spin motion, and the sign showing the rotational direction related to the first and second frequencies of the spin motion stored in the first storage, and driving the spin drive motor at the first and second frequencies of the spin motion according to the processing order.

The agitation/defoaming device can revolve the container holder and spin the container holder at two different rotational velocities suppressing the loss of the power transmission between the orbital drive motor and the spin drive motor. Consequently, precise agitation/defoaming processing can be achieved and furthermore, miniaturization of the device can be accomplished.

Advantageous Effects of Invention

According to the agitation/defoaming method and the agitation/defoaming device, by performing two kinds of processings that excel in agitation and defoaming effects at least once respectively, a highly precise agitation/defoaming treatment can be achieved and also manufacturing costs can be reduced.

BRIEF DESCRIPTION OF DRAWINGS

FIGS. 2A, 2B, 2C, and 2D Pattern diagrams of each relationship between the revolution and rotation;

FIG. 6 Optical microscope photographs showing defoaming effects;

DESCRIPTION OF EMBODIMENTS

Embodiments of the present invention will be described below with reference to drawings. However, each embodiment and example should not be interpreted so as to limit the gist of the invention. The same or similar members are identified with the same symbols, and their description may not be repeated.

First Embodiment

A first embodiment of the agitation/defoaming method according to the embodiments of the present invention is described below.

<Device Configuration>

Figure 1:
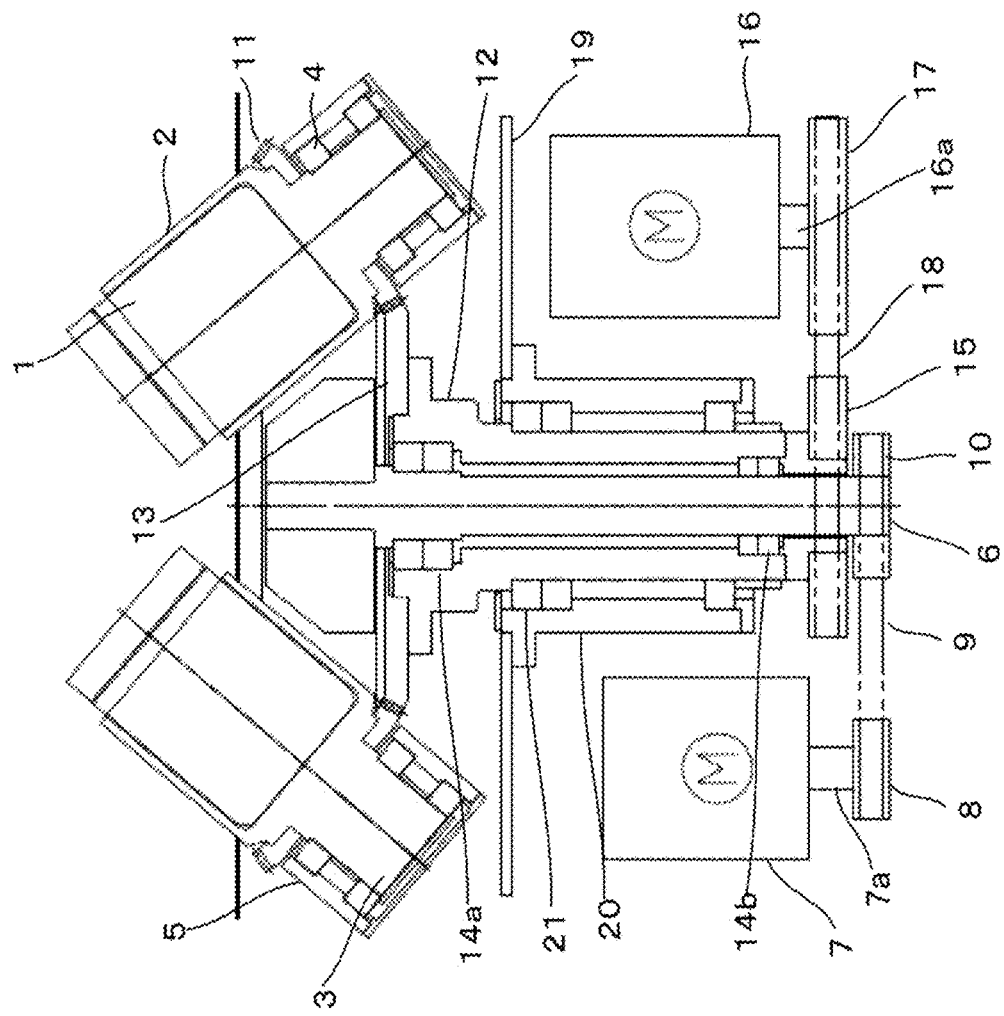
FIG. 1 A cross-sectional view of a agitation/defoaming device according to a first embodiment of the present invention.

FIG. 1 is a cross-sectional view illustrating an internal structure of the agitation/defoaming device according to the embodiments of the present invention. Object to be processed is contained in a container 1, and the container is inserted into a container holder 2. Depending on the type of the object contained and the processing condition, the material of the container can be selected from polyethylene, ceramic, stainless, aluminum alloy, and paper etc.

The container holder 2 has a spin shaft 3, and rotatably contacts a rotational unit 5 through a bearing 4. The rotational unit 5 can hold the container holder 2 while the rotational unit 5 is orbiting. In other words, the container holder 2 revolves together with the rotational unit 5. In this case, for the bearing 4, a bearing that can individually and/or concurrently support a thrust directional force and a radial directional (rotational) force to the spin shaft 3 can be applied.

The rotational unit 5 is fixed to an orbital shaft 6, and thus, an orbital motion described below is transmitted to the rotational unit 5 through the orbital shaft 6. The orbital shaft 6 is parallel to the vertical direction.

A spin shaft 3 is inclined at a predetermined angle to horizontal direction, for example, 50°, and is intersected with the orbital shaft 6 at the above predetermined angle. In this case, the inclining angle can be set to an optional angle within a range from 0° (horizontal) to 90° (vertical).

A pulley 8 is fixed to a shaft 7a of an orbital drive motor 7, and a pulley 10 is fixed to the orbital shaft 6. An orbital motion of the orbital drive motor 7 is transmitted from the pulley 8 to the pulley 10 through a belt 9. The shaft 7a is rotationally-driven by the orbital drive motor 7, and the orbital motion is transmitted to the orbital shaft 6.

As described above, although the orbital drive motor 7 is connected with the orbital axis 6 using a first rotational motion transmission member (power transmission member) that is a combination of the pulley and the belt, a combination of gear wheels as well other than a combination of the pulley and the belt may be used as the rotational motion transmission member.

In this case, a drive shaft can be intervened between the gear wheels without enlarging the gear wheels (addendum circle diameter), and then, the placement site of the drive motor can be offset from beneath the rotating portion.

A gear wheel 11 is fixed to the container holder 2, and a gear wheel 13 is fixed to a spin drive shaft 12. The gear wheel 11 is engaged with the gear wheel 13. A spin motion of the spin drive shaft 12 is transmitted to the container holder 2 through the gear wheels 11 and 13.

In this case, a combination of the pulley and the belt as well other than a combination of gear wheels can be also used as a second rotational motion transmission member, which is the above combination of gear wheels, for connecting the spin drive shaft 12 with the container holder 2.

The spin drive shaft 12 is cylindrical (pipe like), and rotatably contacts the orbital shaft 6 through bearings 14a and 14b. A pulley 15 is fixed to the spin drive shaft 12, and a pulley 17 is fixed to a shaft 16a of the spin drive motor 16. The spin motion of the spin drive motor 16 is transmitted from the pulley 17 to the pulley 15 through a belt 18.

In other words, the shaft 16a is rotationally-driven by the spin drive motor 16, and the spin motion is transmitted to the spin drive shaft 12 and then, to the container holder 2. In this case, for the bearings 14a and 14b, a bearing that can individually and/or concurrently support a thrust directional force and a radial directional (rotational) force to the spin shaft 3 can be applied.

A combination of gear wheels as well other than a combination of the pulley and the belt can be also used as a third rotational motion transmission member, which is the above combination of the pulley and the belt, for connecting the spin drive motor 16 with the spin drive shaft 12.

The orbital drive motor 7 and the spin drive motor 16 are fixed to a fixed base 19, and a cylindrical body 20 is also fixed to the fixed base 19. The spin drive shaft 12 rotatably contacts the cylindrical body 20 through a bearing 21.

In this case, for the bearing 21, a bearing that can individually and/or concurrently support a thrust directional force and a radial directional (rotational) force to the spin shaft 3 can be applied.

As described above, since the orbital motion of the orbital drive motor 7 and the spin motion of the spin drive motor 16 are transmitted to the container holder 2, the container holder 2 can spin and orbit. Examples of the orbital drive motor 7 and the spin drive motor 16 include a servomotor, but a motor that can precisely control frequencies of the orbital and spin motions is enough to be used.

Each frequency of the orbital motion and the spin motion can be optionally controlled using each rotational frequency of the orbital drive motor 7 and the spin drive motor 16. The orbital drive motor 7 and the spin drive motor 16 can control not only the rotational frequencies but also the rotational direction, and can achieve optional combinations of the frequencies and directions of the orbital and spin motions.

Additionally, in order to control each rotational frequency of the orbital motor and the spin motor, the regenerative resistor is detected using a drive controller and the regenerative current generated at that time may be additionally used to control each rotational frequency of the orbital and spin motor.

Since the container 1 containing the object to be processed is inserted in the container holder 2, the object receives the centrifugal force generated by the spin and orbital motions, and then it is agitated/defoamed.

<Agitation/Defoaming Treatment>

According to the embodiments of the present invention, two kinds of processing condition, each of which has different specific effect of the agitation/defoaming treatment, are prepared, and the agitation/defoaming treatment is performed by performing each treatment.

The specific processing conditions and their effects will be described in detail below.

First, the spin velocity is assumed to be a velocity with the same frequency and direction as those of the orbital motion.

The FIGS. 2A, 2B, 2C, and 2D schematically illustrate temporal transitions of a positional relationship between an orbiting disk 100 and a spinning disk 101. In FIGS. 2A, 2B, 2C, and 2D, A, B, C, and D are points on the spinning disk 101, a is a point on the orbiting disk 100, they are marked for convenience sake to visualize the state of the rotations. In FIGS. 2A, 2B, 2C, and 2D, the outline arrows represent the orbital direction, and the black-painted arrows represent the spin direction.

FIGS. 2A, 2B, 2C, and 2D respectively show positional relationships between the disk 100 and the disk 101 rotated by every quarter turn. When the frequency and the direction of the orbital motion are the same as those of the spin motion, the spinning disk 101 appears as if to be stopping on the disk 100.

The rotational frequency means a rotational frequency per unit time, and thus, means a rotational speed. Subsequently, since a rotational velocity is a vector quantity, a rotational direction and a rotational frequency (rotational speed) are defined as described above.

According to the embodiments of the present invention, two kinds of processing conditions, which include additionally superimposing predetermined rotational velocities in a direction opposite to the orbital motion and in the same direction as the orbital motion on the above spin motion, are prepared. In other words, a processing condition of rotating at frequencies $(\Omega-\omega)$ and $(\Omega+\omega)$ of the spin motion is prepared, wherein $\Omega$ is a frequency of the orbital motion (e.g., $\Omega>1$) and $\omega$ is a predetermined rotational frequency (e.g., $\omega>0$).

The agitation/defoaming treatments according to each condition are hereinafter called as a reverse rotation superimposition processing and a same rotation superimposition processing. For simplicity, for the spin motion, a rotation which is additionally superimposed on the velocity of the orbital motion is called as "rotation superimposed on the spin motion."

If a positive value is assigned to one of clockwise and counterclockwise directions and a negative value is assigned to the other, a rotational direction can be related to a rotational frequency using the plus (+) and minus (−) signs. Consequently, if $\Omega$, $(\Omega-\omega)$, and $\Omega+\omega$ have the same signs, that is, their signs are all the plus (+) signs or all the minus (−) signs, the rotational drive direction of the orbital drive motor is the same as that of the spin drive motor.

In an actual agitation/defoaming device, the spinning disk 101 corresponds to the container 1 (and the container holder 2).

Figure 3A:
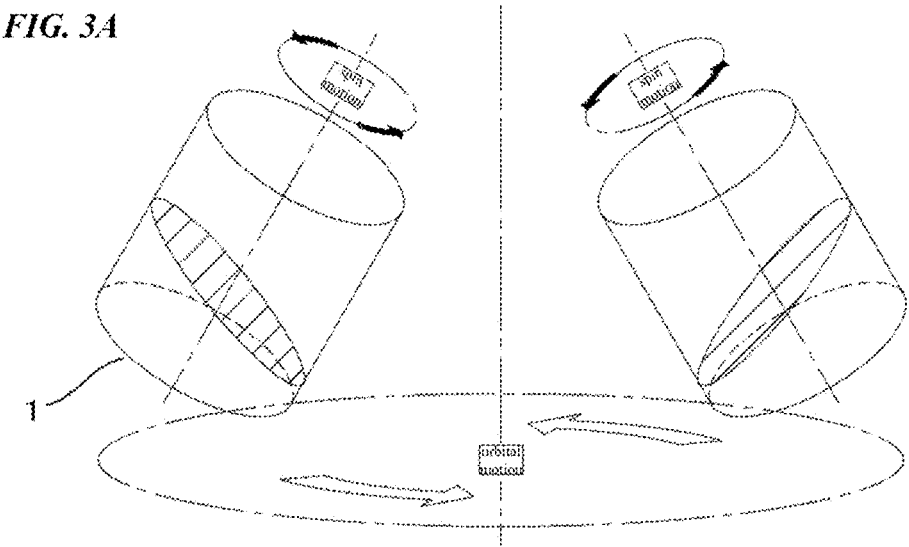
FIGS. 3A and 3B Birds-eye views illustrating rotational directions of the orbital motion and the superimposed rotation on the spin motion for the container.
Figure 3B:
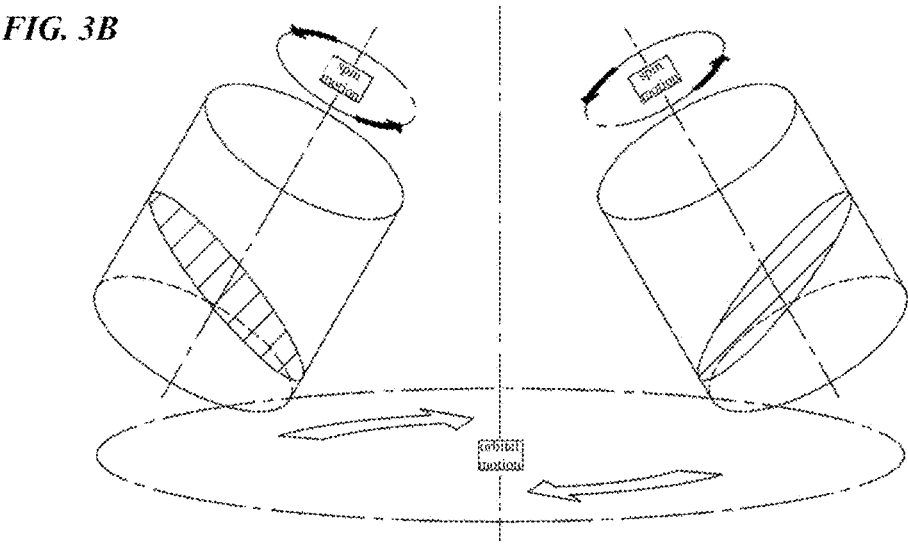

FIGS. 3A and 3B illustrate the directions of the orbital motion and the directions of the rotation superimposed on the spin motion for the container 1. In FIGS. 3A and 3B, the outline arrows represent the orbital direction, and the black-painted arrows represent the spin direction. FIG. 3A illustrates a same rotation superimposition processing and FIG. 3B illustrates a reverse rotation superimposition processing, and FIGS. 3A and 3B respectively illustrate each relationship of the directions of the spin and orbital motions.

In this situation, the direction of the spin motion is preferably a counterclockwise direction so that screws of the container hardly comes loose, but it is not limited to that.

Comparative examinations of agitation/defoaming effects have been conducted for the reverse and same rotation superimposition processings, and the result is described below.

<Agitating Effect>

Since the color of object to be processed would change according to an oxidation-reduction reaction, the changes in color of the object were checked as a means for confirming a agitating effect.

The details are as follows. First, iodine was added to a solution to color the object (iodostarch reaction). Subsequently, a reducing agent was added to the solution, and the solution was contained in a container. Second, the reduction reaction was promoted by agitating the object in the container under each processing condition using the agitation/defoaming device, and the time until the color of the object disappears is measured.

The above time was used as an index of the agitating effect. It means that the shorter the time is, the larger the agitating effect is.

Figure 4:
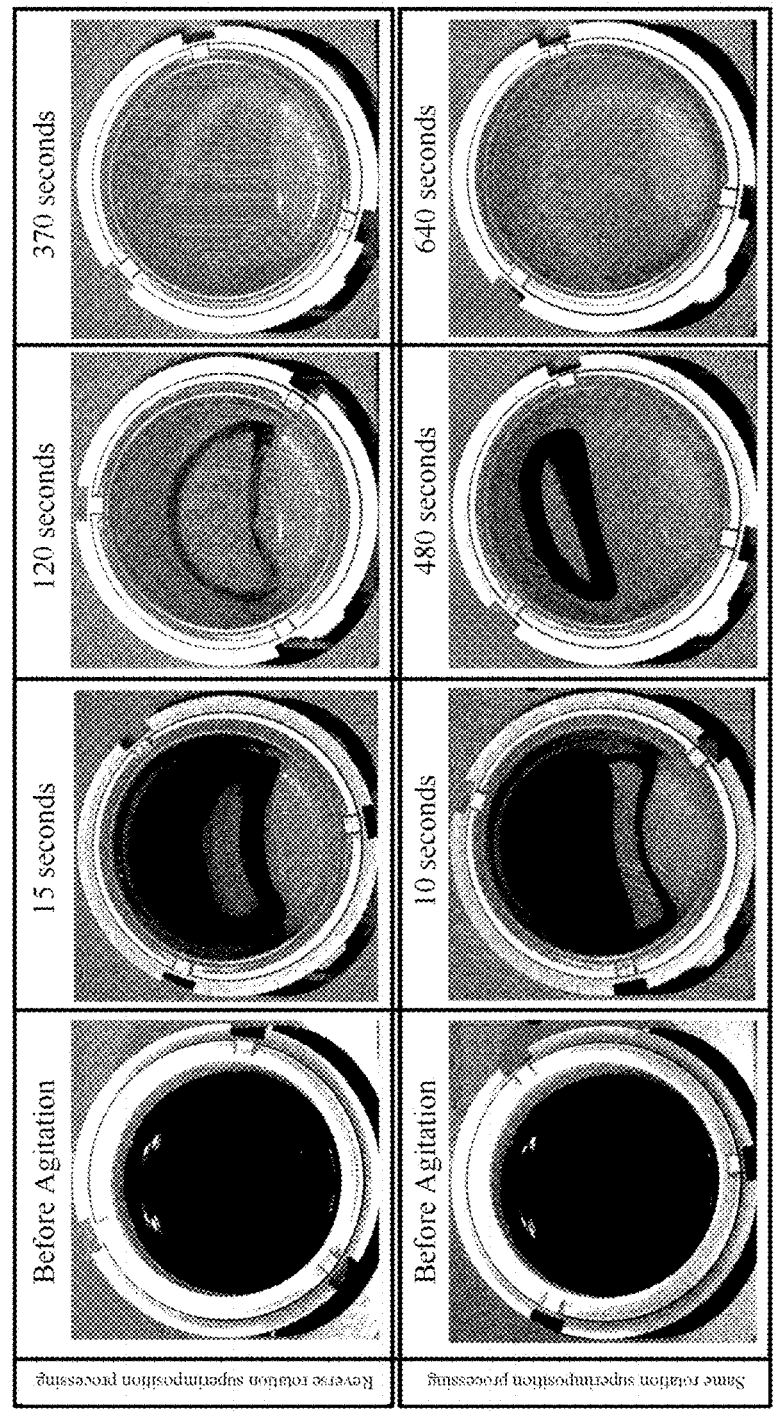
FIG. 4 Photographs showing transitional changes of a reduction reaction.

FIG. 4 includes photographs, where the changes in color of the object during a agitating treatment are shown in comparison of the reverse and same rotation superimposition processings. The frequency of the orbital motion was set to 1000 rpm, and the rotational frequency of the rotation superimposed on the spin motion was set to 500 rpm in the reverse and same rotation superimposition processings. In order to monitor the state of the object inside the container during the agitating treatment, the object was strobe-photographed from the upper side of the container.

A black portion in each photograph is a portion colored by the iodostarch reaction, and the portion is an area where the reduction reaction has not completed. With Reference to FIG. 4, the time until the black portion of the object inside the container has disappeared is 370 seconds for the reverse rotation superimposition processing, and 640 seconds for the same rotation superimposition processing.

As shown in FIG. 4, in a photograph showing 120 seconds for the reverse rotation superimposition processing and 480 seconds for the same rotation superimposition processing, it is seen that a reduction reaction of the object has not completed yet because a belt-like black area remains on the photograph.

The belt-like black area in the photograph is widely different for the reverse and same rotation superimposition processings, and it shows that the flows (vortexes) of the object in the containers are different.

Furthermore, in order to investigate the dependence on the rotational frequency of the rotation superimposed on the spin motion, the frequency of the orbital motion is fixed at 1000 rpm, the rotational frequency of the rotation superimposed on the spin motion is varied, and the agitating effect is measured using the above method.

Figure 5:
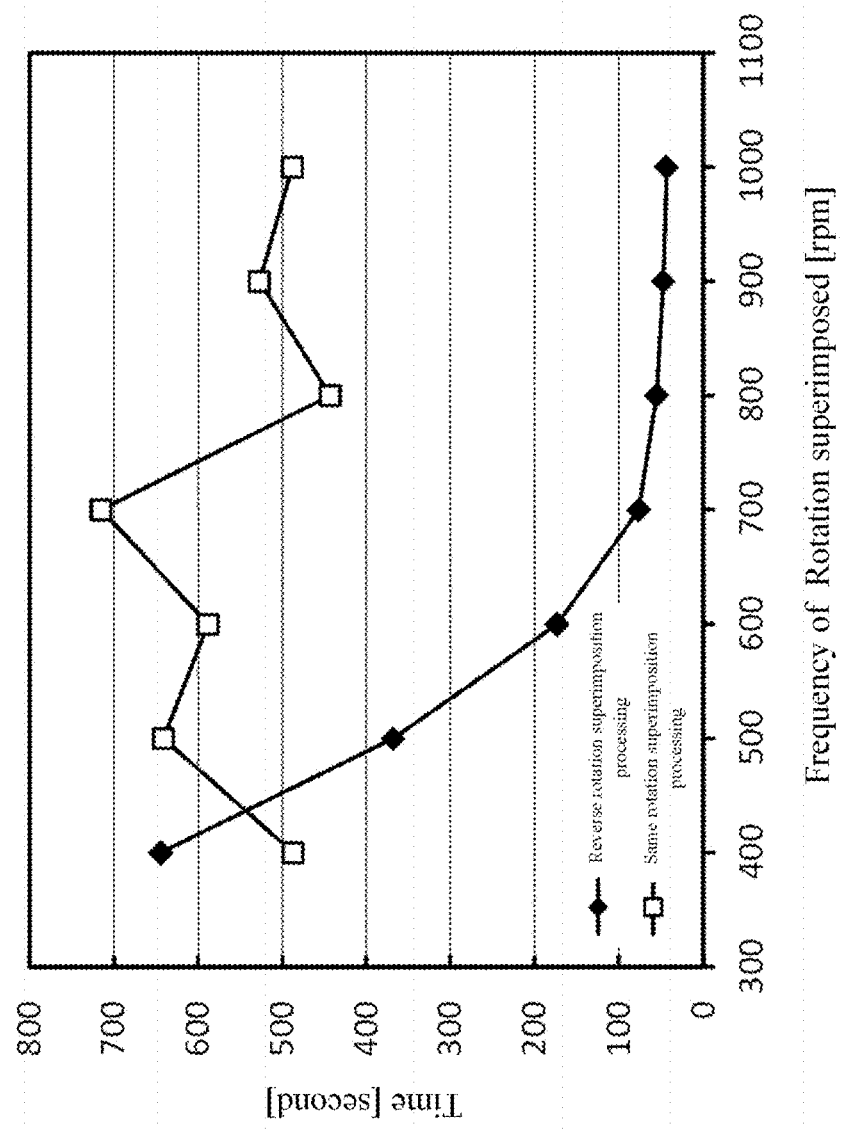
FIG. 5 A graph showing agitating effects.

FIG. 5 is a graph showing a measured result of the agitating effects. The rotational frequency of the rotation superimposed on the spin motion is plotted in a horizontal axis, and the time until the color of the object to be processed disappears by a reduction reaction is plotted in a vertical axis.

For the reverse rotation superimposition, if the rotational frequency that superimposes on that of the spin motion is increased, the time required for the reaction is shortened and thus, it is seen that the agitating effect is improved. On the other hand, for the same rotation superimposition, the dependence on the rotational frequency to be superimposed is not seen, and the time required for the reaction is long for any rotational frequencies. Consequently, it is seen that the more superior agitating effect is acquired when the reverse rotation superimposition is performed.

<Defoaming Effect>

Subsequently, a defoaming effect was investigated from two viewpoints. One is an effect to remove air bubbles internally existing in the object, and the other is an effect to prevent air bubbles from being newly mixed (generated). Hereinafter, the former is called as "a defoaming effect" and the latter is called as "a bubble-mixing prevention effect."

FIG. 6 includes optical microscope photographs showing a defoaming effect. Silicone oils (viscosity: 60,000; 100,000; and 300,000 cSt) where air bubbles internally existed were prepared as objects to be processed, and dependence on the processing time for the defoaming effect was evaluated by performing the reverse and same rotation superimposition processings.

Each state of the silicone oils after processing was optical-microscope-photographed at a magnification of 50 times. For the agitation/defoaming condition, the frequency of the orbital motion was set to 1000 rpm, and the frequency of the rotation superimposed on the spin motion was set to 500 rpm.

When the reverse rotation superimposition processing is performed on the silicone oil (for 600 seconds and 1,800 seconds), for the samples with viscosity 60,000 cSt the defoaming effect can be confirmed, but for both of the samples with viscosities 100,000 cSt and 300,000 cSt a plenty of air bubbles are existing. Consequently, no defoaming effect is observed for the samples with high viscosities.

On the other hand, when the same rotation superimposition processing is performed on the silicone oil (for 600 seconds and 1,800 seconds), bubbles are markedly decreased in the all samples. In other words, the higher the viscosity is, the more conspicuous the difference of the defoaming effect between the reverse and same rotation superimposition processings. Consequently, it is seen that the same rotation superimposition processing achieves a high defoaming effect even if the viscosity of the object is high (e.g. 300,000 cSt).

The reason why the same rotation superimposition processing achieves a high defoaming effect is considered that the synergistic effect of the orbital motion and the spin motion-works more effectively for the defoaming treatment. Additionally, it is considered that the object overspreads widely and its layer is formed in the surface portion of the object along the inside surface of the container, and bubbles contained in the object tend to move to the surface portion and the thin film effect makes more air bubbles to burst.

Figure 7:
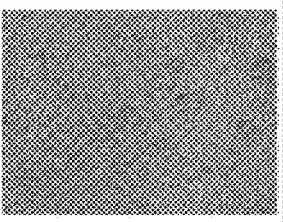
FIG. 7 Optical microscope photographs showing bubble-mixing prevention effects.

FIG. 7 shows optical microscope photographs indicating a bubble-mixing prevention effect. Silicone oils (viscosity: 60,000; 100,000; and 300,000 cSt) where no air bubbles internally existed was prepared, and dependence of the bubbles mixed in the silicone oils on the processing time was evaluated for the cases of the reverse and same rotation superimposition processings.

Each state of the silicone oils after processing was optical-microscope-photographed at a magnification of 50 times. The frequency of the orbital motion was set to 1000 rpm, the frequencies of the rotation superimposed on the spin motion were set to 700, 500 and 300 rpm for the silicone oil with viscosity 60,000, 100,000, and 300,000 cSt respectively.

In FIG. 7, when the reverse rotation superimposition processing is performed, the bubbles are contained for the samples at the processing time of 180 seconds and 300 seconds. For the samples with viscosities 100,000 and 300,000, bubbles are increasing with the processing time. Consequently, it is seen that bubbles are generated and mixed in the silicone oil during the reverse rotation superimposition processing.

On the other hand, when the same rotation superimposition processing is performed, the number of air bubbles is small in the samples with every viscosity.

Namely, even if the rotational frequencies of the rotational velocities superimposed on speed $\Omega$ of the orbital motion is the same value ($\omega$), the defoaming effect and the bubble-mixing prevention effect are markedly different when the rotational direction is different ($\Omega-\omega$ or $\Omega+\omega$), and the same rotation superimposition processing ($\Omega+\omega$) is superior on any effect.

Consequently, as for the defoaming effect, the same rotation superimposition processing is superior to the reverse rotation superimposition processing, but, on the other hand, as for the agitating effect, the reverse rotation superimposition processing is superior to the same rotation superimposition processing.

Table 1 shows a comparison result of the agitating effect of the reverse rotation superimposition processing and the defoaming effect of the same rotation superimposition processing. For each effect, the dependence on the rotational frequency of the rotation superimposed on the spin motion is evaluated in 4 grades and shown in Table 1, and the effect is further improved in the order of the symbols of "D", "C", "B", and "A." In Table 1, "reverse rotation" indicates "reverse rotation superimposition processing," and "same rotation" indicates "same rotation superimposition processing."

It is seen that the larger the rotational frequency of the rotation superimposed on the spin motion is, the higher agitating effect is obtained. On the other hand, it is seen that the larger the rotational frequency of the rotation superimposed on the spin motion is, the higher defoaming effect is obtained.

TABLE 1

| Frequency of Rotation superimposed | Agitation | | Defoaming | |
|---|---|---|---|---|
| (Ratio: vs Orbital motion) | Reverse rotation | Same rotation | Reverse rotation | Same rotation |
| 3 | A | A | D | D |
| 2.5 | A | A | D | D |
| 2 | A | B | D | D |
| 1.6 | A | B | D | C |
| 1.3 | A | C | D | C |
| 1 | A | C | D | C |
| 0.8 | A | C | D | C |
| 0.6 | B | C | D | B |
| 0.4 | B | D | C | B |
| 0.2 | C | D | B | A |
| 0.1 | D | D | B | A |
| 0.05 | D | D | A | A |

With Reference to Table 1, when both of agitating and defoaming effects are regarded as important, by setting the rotational frequency of the rotation superimposed on the spin motion to, for example, 0.6 times of the frequency of the orbital motion, performing the reverse and same rotation superimposition processings at least once, and adjusting each processing time, an optimal agitation/defoaming effect can be achieved easily. Accordingly, different from the conventional adjustment for the processing time and the rotational frequencies of the orbital and spin motions, which is made by trial-and-error method based on operator's experience, the adjustment parameter is configured to be the time only, and it allows the condition to be easily optimized.

Consequently, the effort and the processing time for determining the processing condition can be decreased, and it leads to the reduction of the labor cost and the raw material cost required for the experimental trials.

Additionally, if the time of the same rotation superimposition processing is prolonged, the enough defoaming treatment can be achieved as shown in FIG. 6. Consequently, even if the condition prioritizes the agitating effect, the effect that the end product requires can be achieved as well.

With Reference to Table 1, in one example, if the agitating effect is prioritized, the rotational frequency of the rotation superimposed on the spin motion may be set to be 1.6 times as much as the frequency of the orbital motion. On the other hand, if the defoaming effect is prioritized, the rotational frequency of the rotation superimposed on the spin motion may be set to be 0.2 times of the frequency of the orbital motion, and each processing time of the reverse and same rotation superimposition processings may be adjusted.

By selecting the condition (the rotational frequency of the rotation superimposed on the spin motion) according to the specifications of the required product, the total processing time can be shortened and also the manufacturing cost can be reduced.

The reason why the agitating and defoaming effects of the reverse rotation superimposition processing and the same rotation superimposition processing are markedly different is considered to be based on the interference effect occurred by the superimposition of the rotation with opposite direction on the orbital motion.

When the same rotation superimposition processing is performed, inside the container, for example, at the furthest portion from the revolution axis (the portion where the centrifugal force is maximized), the rotation directions of the orbital motion and spin motion are the same, and thus, the spin velocity and the orbital velocity are mutually strengthened.

On the other hand, inside the container, for example, at the nearest portion from the revolution axis (the portion where the centrifugal force is minimized), the rotation directions of the orbital motion and spin motion are opposite, and thus, the spin velocity and the orbital velocity are mutually cancelled.

When the reverse rotation superimposition processing is performed, compared with the same rotation superimposition processing, the interference effect of the spin velocity and the orbital velocity is opposite. Consequently, it is supposed that, since the behavior of the force that applied to the object inside the container are markedly different between the reverse and same rotation superimposition processings, the difference between the agitating and defoaming effects appears markedly.

In the agitation/defoaming treatment with the orbital and spin motions, the conventional method, which the direction of the spin motion or the orbital motion is simply inverted, cannot achieve an efficient interference effect of the spin motion and the orbital motion and such a marked difference of the effect cannot be obtained.

Additionally, the conventional defoaming treatment adopts a condition to reduce a ratio of spin motion to orbital motion. In the present invention, but the reverse and same rotation superimposition processings are respectively performed and the rotational frequency of the rotation superimposed on the spin motion can be set to high in the same rotation superimposition processing, and the condition having a wider range than that of the conventional method can also be selected. Consequently, the optimum conditions, which has been conventionally hard to obtained or has required a great deal of work, for preventing the separation of mixed liquid including components different in specific gravity can be easily obtained.

Although the rotational frequencies of the rotation superimposed on the spin motion are the same in the above two kinds of processing, each rotational frequency superimposed can be respectively adjusted for the reverse and same rotation superimposition processings, and the different specific rotational frequencies can also be superimposed.

In other words, the rotational frequency superimposed in a direction opposite to the orbital motion during the reverse rotation superimposition processing is to be a first rotational frequency, the rotational frequency superposed in the same direction as the orbital motion during the same rotation superimposition processing is to be a second rotational frequency, and the first and second rotational frequencies may be not only the same, described above, but also different each other.

In this case, the first and second rotational frequencies are set so as to be within a range that the agitating and defoaming effects effectively work, and each condition setting can also be set in a wide range that each agitating and defoaming effect is enhanced.

Specifically in Table 1, the range of the first rotational frequency that the agitating effect can be obtained is equal to or more than 0.2 times and equal to or less than 2.0 times as the frequency of the orbital motion, the range of the second rotational frequency that the defoaming effect can be obtained is equal to or more than 0.05 times and equal to or less than 1.6 times as the frequency of the orbital motion, and thus, each rotational frequency can be set within the ranges.

Since the first and second rotational frequencies can be determined by a ratio of the frequency of the orbital motion to them, these ratios can be stored in advance into a device described below, and the first and second rotational frequencies can be calculated from these ratios. It results in the deduction in the labor for determining the optimal condition, and the deduction in the costs.

<Agitation/Defoaming Treatment Method>

Flows of a agitation/defoaming treatment using the reverse and same rotation superimposition processings are described below. In the following, in order to clarify processing characteristics of each step (process flow), a processing primarily intended to agitating is called as "agitating step," and a processing primarily intended to defoaming is called as "defoaming step." The reverse rotation superimposition processing is performed in the agitating step, and the same rotation superimposition processing is performed in the defoaming step.

In the following description, a starting step means to be for containing object to be processed in a container, inserting the container into a container holder, setting a processing condition, and operating a device, and an ending step means to be for taking the container out of the container holder after confirming that rotating of the container is stopped completely.

Figure 8:
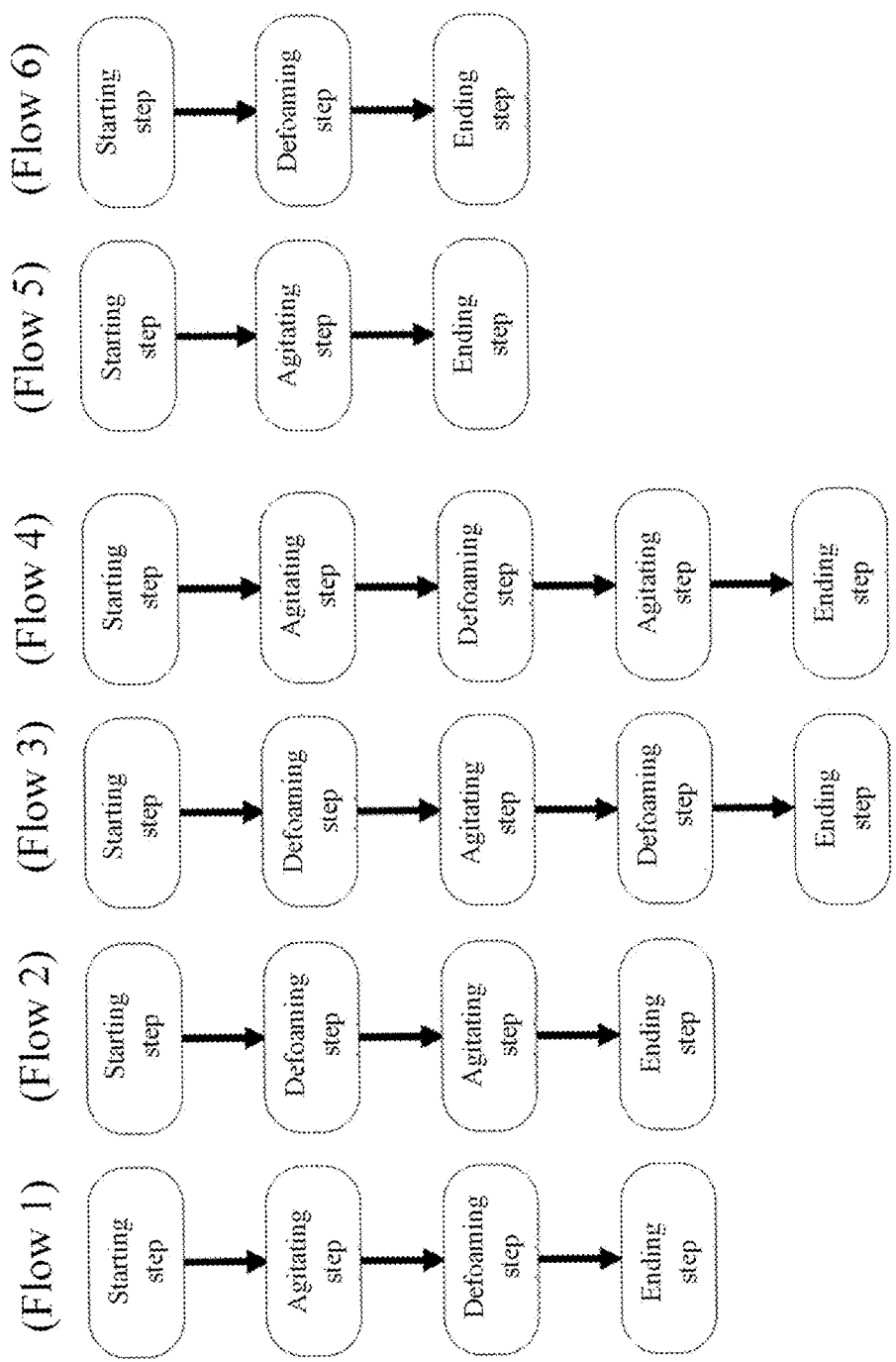
FIG. 8 Flowcharts of agitation/defoaming treatments.

FIG. 8 shows flows of the agitation/defoaming treatment using the device. The flow consist of a starting step, a agitating step, a defoaming step, and an ending step, and is classified into four principal combinations of the agitating and defoaming treatment below. Additionally, each agitating and defoaming steps can include a plurality of processings performed. Only the agitating step may be performed or only the defoaming step may be performed, and it is needless to say that the device is also capable to efficiently work in such a situation.

Each flow is concretely described in the following order. A right arrow hereinafter represents an order of the flow.

(Flow 1) starting step→agitating step→defoaming step→ending step

This flow aims to remove air bubbles that should be removed in the defoaming step after the object is agitated in the agitating step.

(Flow 2) starting step→defoaming step→agitating step→ending step

This flow aims to remove air bubbles generated when the object to be processed is fed into the container in the defoaming step, and to agitate the object that includes no air bubbles.

(Flow 3) starting step→defoaming step→agitating step→defoaming step→ending step

This flow aims to remove air bubbles like in Flow 2, to agitate the object that includes no air bubbles, and to remove air bubbles generated in the agitating step.

(Flow 4) starting step→agitating step→defoaming step→agitating step→ending step

This flow aims not only to remove air bubbles that should be removed in the defoaming step after agitating in the agitating step but also to planarize the object surface in the final agitating step for the convenience of the next step in case the object has risen in the defoaming step.

(Flow 5) starting step→agitating step→ending step

This flow is applied mainly when the agitating treatment is required.

(Flow 6) starting step→defoaming step→ending step

This flow is applied mainly when the defoaming treatment is required.

Each flow of the agitation/defoaming treatment consists of an order and information content of each step that should be processed, as described above.

The order and the processing content of each step is associated with each flow and is stored in the flow storage built in the device in advance. Alternatively, an operator may input and store the processing condition in the flow storage during the starting step.

The above flows enable the treatment to be efficiently (quickly) processed in accordance with the product standards required (an uniformity of dispersion or an air mixed quantity that is required after processing). The operator selects or specifies the desired flow during the starting step.

<Agitation/Defoaming Treatment Using Agitation/Defoaming Device>

Since the above device is a drive mechanism separately including a motor for driving the orbital motion and a motor for driving the spin motion, the rotational frequency superimposed on the frequency of the spin motion can be changed independently from the orbital motion depending on each step. During the reverse rotation superimposition processing, a spin drive motor is rotated at a rotational frequency obtained by subtracting a predetermined rotational frequency from the rotational frequency being equal to the frequency of the orbital motion, and during the same rotation superimposition processing, the spin drive motor is rotated at a rotational frequency obtained by adding a predetermined rotational frequency to the rotational frequency being equal to the frequency of the orbital motion.

A control unit built in the device performs the agitation/defoaming treatment according to the specified processing condition during each step specified in the above flows. The concrete execution content of the device is as follows.

First, a frequency of the orbital motion, first and second rotational frequencies to be superimposed are stored in a first storage built in the device. In this case, the rotational frequencies of the first and second rotational motion or ratios of each of the first and second rotational frequencies to the frequency of the orbital motion may be stored as the first and second rotational frequencies. The first storage and the flow storage can be the same device.

Subsequently, according to instructions from a control unit consisting of a microcomputer or the like built in the device, a calculation for the frequency of the orbital motion and the first and second rotational frequencies is performed in the operation unit consisting of the microcomputer or the like.

Concretely, the frequency of the orbital motion and the first and second rotational frequencies are read from the first storage, a first frequency of the spin motion is obtained by subtracting the first spin frequency from the frequency of the orbital motion, and a second frequency of the spin motion is obtained by adding the second rotational frequency to the frequency of the orbital motion.

If the rations of the first and second frequencies to the frequency of the orbital motion are stored, the first and second frequencies of the spin motion can be obtained in the operation unit, after the first and second rotational frequencies are calculated form the ratios and the frequency of the orbital motion. "The first and second rotational frequencies" means not only the rotational frequencies themselves but also the rations of the first and second rotational frequencies to the frequency of the orbital motion.

Subsequently, the operation unit stores the first and second frequencies of the spin motion into the second storage. The first storage and the second storage can be the same device.

Subsequently, the control unit consisting of the microcomputer or the like built in the device reads a flow information (an order of the steps and processing content in each step) specified at the starting step form the flow storage. After that, the control unit reads the frequency of the orbital motion and the first and second frequencies of the spin motion, which are specified in the flow that has read in, from the first storage and the second storage, and controls and drives the orbital and spin drive motors according to the order of the steps specified. The operation unit and the control unit can be the same device (for example, the same microcomputer).

As described above, since the agitation/defoaming device according to the embodiments of the present invention includes the spin and orbital drive mechanisms, the storages, the operation unit, and the control unit, the reverse and same rotation superimposition processings can be performed according to the specified flow.

A comparison with a numerical value calculated from the processing condition specified and a database of the processing condition stored in the storage in advance may allow the suitable processing step and/or drive-control condition to be selected and controlled. The control unit may automatically perform these selection processings of step/condition.

Second Embodiment

In the first embodiment, orbital and spin motions are driven using two motors fixed to a fixed base as illustrated in FIG. 1. On the one hand, in a second embodiment, a spin drive motor is configured to be disposed on an orbital drive motor. This configuration allows an orbital motion of the orbital drive motor to be transmitted to a main body of the spin drive motor. Consequently, while the main body of the spin drive motor is revolving (orbiting), the spin motion is transmitted to a container holder.

An orbital shaft is fixed to a rotor of the orbital drive motor, and a spin shaft is fixed to a rotor of the spin drive motor. Consequently, the loss of the power transmission between the shafts and the drive motors can be suppressed, and the orbital and spin motions can be controlled more precisely.

Additionally, since the orbital drive motor and the spin drive motor form a two-staged stacked structure, it enable the device to be downsized.

Figure 9:
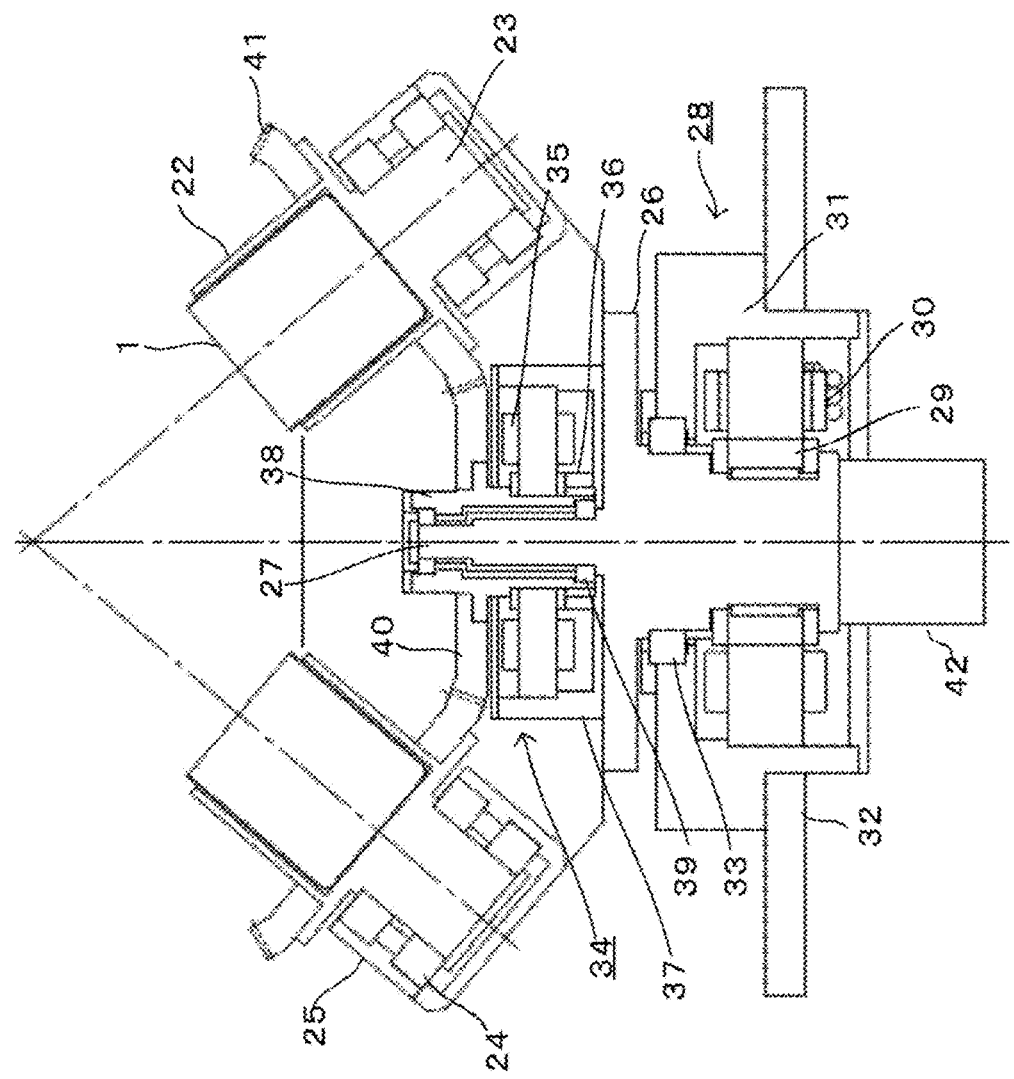
FIG. 9 A cross-sectional view of a agitation/defoaming device according to a second embodiment of the present invention.

With reference to FIG. 9, the detailed description is as follows.

A container 1 is inserted in a container holder 22 in the same way as the first embodiment. The container holder 22 has a spin shaft 23. The spin drive shaft 23 rotatably contacts a rotational unit 25 through a bearing 24.

The rotational unit 25 is fixed to a horizontal plate 26, and the horizontal plate 26 is fixed to an orbital shaft 27. An orbital drive motor 28 includes a rotor 29 and a stator 30. The stator 30 is fixed to a fixed base 32 through a casing 31 of the orbital drive motor 28. The rotor 29 is fixed to the orbital shaft 27, and rotatably contacts the casing 31 of the orbital drive motor 28 through a bearing 33. Consequently, the orbital shaft 27 rotates with respect to the fixed base 32.

Since the orbital shaft 27, the horizontal plate 26, and the rotational unit 25 are fixed each other, all of them are directly driven by the orbital drive motor 28 and orbit. As a result, the container holder 22 orbits.

Additionally, a spin drive motor 34 is fixed to the horizontal plate 26. Consequently, the orbital drive motor 28 makes the orbital shaft 27, the horizontal plate 26, and the spin drive motor 34 orbit.

The spin drive motor 34 includes a stator 35 and a rotor 36, the stator 35 is fixed to the horizontal plate 26 through a casing 37 of the spin drive motor 34, and the rotor 36 is fixed to a spin drive shaft 38. The spin drive shaft 38 rotatably contacts the orbital shaft 27 through a bearing 39, and is directly driven by the spin drive motor 34.

A gear wheel 40 is fixed to the spin drive shaft 38, and a gear wheel 41 is fixed to the container holder 22. The gear wheel 40 is engaged with the gear wheel 41, and thus, the rotation motion of the spin drive motor 34 is transmitted to the container holder 22, and it makes the container holder 22 to perform a spin motion around the spin shaft 23.

In this case, the spin shaft 23 is inclined at a predetermined angle, from 0° to 90°, for example 50°, to the orbital shaft 27. In the above embodiment, although an example using a gear wheel is described as a forth rotational motion transmission member, a combination of a pulley and a transmitting belt can be used.

Since the spin drive motor 34 orbits, the orbital motion is to be superimposed on the spin motion of the spin drive motor 34. Consequently, it is sufficient for the spin drive motor 34 to control only the rotation to be superimposed during the reverse and same rotation superimposition processings. In addition to the rotation to be superimposed, it is suitable that a mutual influence between the inertia forces generated by the orbital and spin motions is controlled.

Concretely, while the frequency of the orbital motion is stored in a first storage, a first rotational frequency that is superimposed on the frequency of the orbital motion for a first frequency of the spin motion, and a second rotational frequency that is superimposed on the frequency of the orbital motion for a second frequency of the spin motion are respectively stored in the first storage built in the device.

The first and second spin motions have each rotational direction, each of which oppositely directs, and a sign related to the first and second frequencies of the spin motion is also stored in the first storage. In one example, a positive value is assigned to a clockwise direction, and either of a positive value or a negative value may be assigned to the frequency of the orbital motion and the first and second frequencies of the spin motion according to their rotational directions.

Alternatively, after a sign showing the rotational direction is assigned where "1" is assigned to a clockwise direction and "0" assigned to a counterclockwise direction, the sign is associated with the frequency of the orbital motion and the first and second frequencies of the spin motion and then stored in the first storage.

A control unit consisting of a microcomputer or the like built in the device drives the orbital drive motor 28 and the spin drive motor 34 according to a specified flow. It means that the control unit reads a predetermined flow stored in a flow storage built in the device, and according to the processing order read, drives the orbital drive motor 28 at a frequency of the orbital motion stored in the first storage, and drives the spin drive motor 34 according to the first or second frequency and direction of the spin motion.

The control unit can control the orbital drive motor 28 and the spin drive motor 34 using an electric power supplied through a slip ring 42. Additionally, a known feeding member to the high-speed rotating object, such as a rotary connector and a wireless power transmission, can also be adopted.

Although two drive motors are used for the above first and second embodiments, only one drive motor may be used, and a driving force transmitting member and a powder brake of the one drive motor also enables both of the orbital and spin motion to be controlled.

REFERENCE SIGNS LIST 1. container
2. container holder
3. spin shaft
4. bearing
5. rotational unit
6. orbital shaft
7. orbital drive motor
7a. shaft
8. pulley
9. belt
10. pulley
11. gear wheel
12. spin drive shaft
13. gear wheel
14a and 14b. bearing
15. pulley
16. spin drive motor
16a. shaft
17. pulley
18. belt
19. fixed base
20. cylindrical body
21. bearing
22. container holder
23. spin shaft 24. bearing
25. rotational unit
26. horizontal plate
27. orbital shaft
28. orbital drive motor
29. rotor
30. stator
31. casing
32. fixed base
33. bearing
34. spin drive motor
35. stator
36. rotor
37. casing
38. spin drive shaft
39. bearing
40. gear wheel
41. gear wheel
42. slip ring

The invention claimed is:

1. An agitation/defoaming method, the method for, by producing an orbital motion and a spin motion of a container containing object to be processed, agitating/defoaming the object,
wherein the spin motion includes a reverse rotation superimposition processing and a same rotation superimposition processing to be respectively performed,
wherein the reverse rotation superimposition processing is performed by superimposing a motion rotated at a first rotational frequency and in a direction opposite to a direction of the orbital motion on a rotational velocity with the same rotational direction as the direction of the orbital motion and the same rotational frequency as a frequency of the orbital motion,
wherein the same rotation superimposition processing is performed by superimposing a motion rotated at a second rotational frequency and in the same direction as the direction of the orbital motion on the rotational velocity with the same rotational direction as the direction of the orbital motion and the same rotational frequency as the frequency of the orbital motion, and
wherein a range of the first rotational frequency is equal to or more than 0.2 times and equal to or less than 2.0 times relative to the frequency of the orbital motion, and a range of the second rotational frequency is equal to or more than 0.05 times and equal to or less than 1.6 times relative to the frequency of the orbital motion.

2. The agitation/defoaming method according to claim 1, wherein the first rotational frequency is equal to the second rotational frequency.

3. The agitation/defoaming method according to claim 1, comprising a processing of performing the same rotation superimposition processing after the reverse rotation superimposition processing.

4. The agitation/defoaming method according to claim 1, comprising a processing of performing the reverse rotation superimposition processing after the same rotation superimposition processing.

5. An agitation/defoaming device, comprising:
a container holder provided with a spin shaft;
a rotational unit that the spin shaft rotatably contacts through a bearing;
an orbital shaft connected with the rotational unit;
an orbital drive motor connected with the orbital shaft using a first rotational motion transmission member;
a spin drive shaft connected with the container holder using a second rotational drive transmission member;
a spin drive motor connected with the spin drive shaft by a third rotational motion transmission member;
a first storage for storing a predetermined frequency of an orbital motion, a first rotational frequency, and a second rotational frequency, wherein a range of the first rotational frequency is equal to or more than 0.2 times and equal to or less than 2.0 times relative to the predetermined frequency of the orbital motion, and a range of the second rotational frequency is equal to or more than 0.05 times and equal to or less than 1.6 times relative to the frequency of the orbital motion;
an operation unit for calculating a first frequency of a spin motion that is obtained by subtracting the first rotational frequency from the predetermined frequency of the orbital motion stored in the first storage, and a second frequency of the spin motion that is obtained by adding the second rotational frequency to the predetermined frequency of the orbital motion stored in the first storage;
a second storage for storing the predetermined frequency of the orbital motion, the first frequency of the spin motion, and the second frequency of the spin motion;
a flow storage for storing a processing order for driving the spin drive motor at the first or second frequency of the spin motion; and
a control unit for driving the orbital drive motor at the predetermined frequency of the orbital motion in a predetermined orbital direction, reading the processing order stored in the flow storage, the first frequency of the spin motion and the second frequency of the spin motion stored in the second storage, and driving the spin drive motor at the first frequency of the spin motion or second frequency of the spin motion according to the processing order.

6. An agitation/defoaming device, comprising:
a container holder provided with a spin shaft;
a rotational unit that the spin shaft rotatably contacts through a bearing;
an orbital shaft fixed to the rotational unit;
an orbital drive motor having a rotor fixed to the orbital shaft;
a horizontal plate fixed to the orbital shaft;
a spin drive shaft connected with the container holder by a fourth rotational motion transmission member;
a spin drive motor that is connected with the spin drive shaft and that has a rotor fixed to the horizontal plate and;
a first storage for storing a frequency of an orbital motion, a first frequency of the spin motion and a second frequency of the spin motion, and a sign showing a rotational direction related to the first and second frequencies of the spin motion;
a flow storage for storing a processing order for driving the spin drive motor at the first frequency of the spin motion or the second frequency of the spin motion; and
a control unit for driving the orbital drive motor at a predetermined orbital frequency in a predetermined orbital direction, reading the processing order stored in the flow storage, the first frequency of the spin motion, the second frequency of the spin motion, and the sign showing the rotational direction related to the first and second frequencies of the spin motion stored in the first storage, and driving the spin drive motor at the first and second frequencies of the spin motion according to the processing order, wherein
the orbital drive motor and the spin drive motor are positioned and rotate coaxially with each other.

7. The agitation/defoaming method according to claim 1, wherein the range of the first rotational frequency is equal to or more than 0.8 times and equal to or less than 2.0 times as the frequency of the orbital motion, and the range of the second rotational frequency is equal to or more than 0.05 times and equal to or less than 0.2 times as the frequency of the orbital motion.

8. The agitation/defoaming method according to claim 1, wherein the reverse rotation superimposition processing is performed by superimposing the motion rotated at the first rotational frequency when agitating the object, and
wherein the same rotation superimposition processing is performed by superimposing the motion rotated at the second rotational frequency when defoaming the object.

9. The agitation/defoaming device according to claim 5, wherein the range of the first rotational frequency is equal to or more than 0.8 times and equal to or less than 2.0 times as the frequency of the orbital motion, and the range of the second rotational frequency is equal to or more than 0.05 times and equal to or less than 0.2 times as the frequency of the orbital motion.

10. The agitation/defoaming device according to claim 5, wherein the reverse rotation superimposition processing is performed by superimposing the motion rotated at the first rotational frequency when agitating the object, and
wherein the same rotation superimposition processing is performed by superimposing the motion rotated at the second rotational frequency when defoaming the object.

11. The agitation/defoaming device according to claim 6, wherein the horizontal plate is disposed between the orbital drive motor and the spin drive motor in a direction in which the orbital shaft.

12. The agitation/defoaming device according to claim 6, wherein the horizontal plate is rotated by the rotation of the orbital shaft.

\* \* \* \* \*